Figure 1:
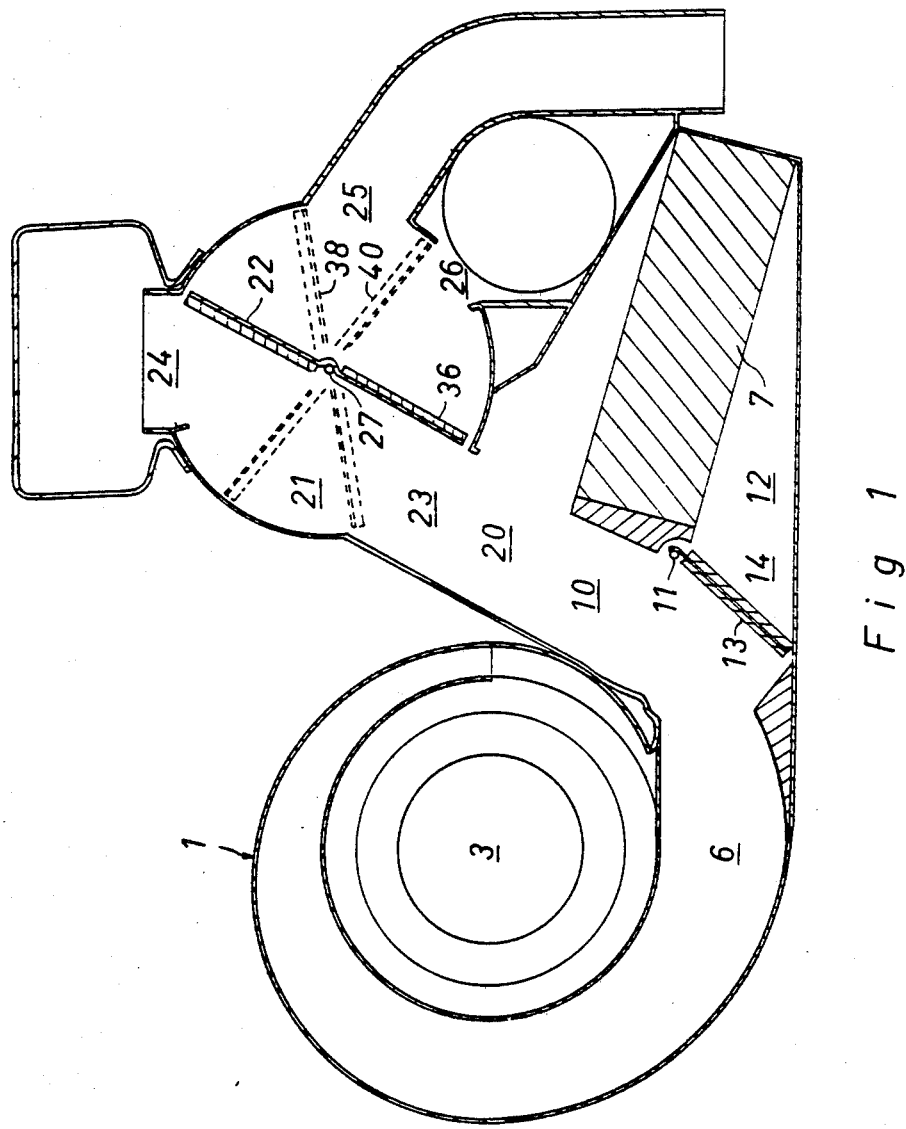

United States Patent [19]

Sarsten et al.

[11] Patent Number: 4,465,123

[45] Date of Patent: Aug. 14, 1984

[54] VEHICLE VENTILATING SYSTEM

[75] Inventors: Rolf B. Sarsten, Henån; Sten E. Nilsson, Vargön, both of Sweden

[73] Assignee: Saab-Scania Aktiebolag, Sweden

[21] Appl. No.: 363,940

[22] Filed: Mar. 31, 1982

[30] Foreign Application Priority Data

Apr. 1, 1981 [SE] Sweden .............................. 8102069

[51] Int. Cl.³ .............................................. F25B 29/00
[52] U.S. Cl. ....................................... 165/16; 98/2.01;
237/2 A
[58] Field of Search .................. 98/2.01, 2.08; 165/16,
165/42, 43; 236/49, 91 F; 237/2 A, 12.3 R

[56] References Cited

U.S. PATENT DOCUMENTS

| 3,656,541 | 4/1972 | Coyle et al. | 165/16 |
| 4,289,195 | 9/1981 | Bellot et al. | 236/91 F |
| 4,337,821 | 7/1982 | Saito | 165/42 X |
| 4,350,289 | 9/1982 | Shimada et al. | 165/16 X |
| 4,364,513 | 12/1982 | Tsuzuki et al. | 236/49 |

FOREIGN PATENT DOCUMENTS 0007775 2/1980 European Pat. Off. .
1255611 12/1971 United Kingdom ................. 98/2.08
1490336 11/1977 United Kingdom .
1508908 4/1978 United Kingdom .

Primary Examiner—Harold Joyce
Attorney, Agent, or Firm—Ostrolenk, Faber, Gerb & Soffen

[57] ABSTRACT

Method and arrangement for providing, in a vehicle ventilating and temperature-regulating system, automatic regulation of flaps for adjusting the temperature of and distributing ventilation air to the vehicle interior. In the system, a ventilation unit has at least one regulatable warm air flap for a heat exchanger mounted in the unit and at least one regulatable air distributor flap for distributing ventilation air to outlets opening out in the vehicle interior. The respective regulatory movements of the flaps are synchronized and made infinitely variable by means of servo means controlled by an electronic unit which receives signals from temperature transducers and, after comparison with signals representing actual and desired interior temperatures, transmits output signals to the servo means for regulating the relative settings of the flaps.

18 Claims, 3 Drawing Figures

VEHICLE VENTILATING SYSTEM

The present invention relates to a method and an arrangement in vehicle ventilating systems for providing automatic regulation of flaps for temperature adjustment and distribution of ventilation air to the interior of the vehicle.

Such ventilating systems in vehicles usually include a part system for temperature adjustment of ventilation air and a part system for distributing ventilation air to different outlets in the vehicle interior. For temperature adjustment the air is caused to pass through a warm air duct formed in a ventilation unit containing a heat exchanger and/or through a cold air duct, subsequent to which the air is mixed once again. The proportion of ventilation air, which is to pass through respective ducts, can be regulated with the aid of a warm air flap, the setting of the flap thus controlling the temperature of the air led into the vehicle interior.

Said air supply takes place via a distribution chamber formed in the ventilation unit, said chamber being supplied with mixed air and having at least one adjustable warm air flap for distributing air to a plurality of outlet nozzles in the vehicle interior. The outlets usually open out close to the vehicle floor, the windscreen (so-called defroster outlets) and at openings in the vehicle fascia board.

Vehicle ventilation systems are usually controlled by manual controls which, via wire transmission or the like, can cause the respective air flap to assume different settings for temperature adjustment and distribution of ventilation air. Setting of the respective controls is often considered to be troublesome to carry out, and this results in that manually controlled ventilation systems often function unsatisfactorily.

It is also known to use vacuum servo-operated air flaps, a control in the vehicle interior for such a flap solely controlling a valve regulating the ON and OFF function of the servo means. These systems are also very often regulated incorrectly, thus causing noticable trouble.

In large passenger cars it is known to arrange automatic ventilation systems controlled by a microprocessor. In such systems the air distribution flap is controlled in principle in the same way as for vacuum servo-controlled flaps, but with the difference that solenoid valves control the vacuum distribution to the servo means instead of manually regulated valves. This enables the setting of several different combinations of air flap attitude.

The use of vacuum servo means in known automatic ventilation systems has the drawback that each air flap can only assume one of two stable settings, either a completely closed position or a completely open position. The amount of air, which can thus be caused to pass through an outlet nozzle, can only be regulated with the aid of a fan having different speeds. Neither is it possible to allow a smaller amount of air to pass through a nozzle and simultaneously allow the maximum amount of air to pass through another nozzle. There is also the risk that such systems come into self-oscillation if the placing of sensors is unsuitable, which means that alternating ON and OFF functions of different outlet nozzles occur in the system.

The present invention has the object of providing, in vehicle ventilation systems, automatic regulation of draft valve means or air flaps such that the drawbacks discussed in adjusting the temperature of, and distributing ventilation air to the interior of a vehicle do not occur.

The invention is characterized in said respect in that the regulating movements of the air flaps are synchronized and made infinitely variable by means of servo means controlled by an electronic unit, which receives signals from a plurality of temperature transducers and after comparison with signals representing the actual interior temperature and desired interior temperature transmits output signals to the servo means for regulating the relative settings of the air flaps.

An electric motor connected to each air flap shaft is preferably used as a servo means, resulting in that the flaps can assume settings between that of completely open and that of completely closed. The air distribution can thereby be regulated within wider limits than what is possible in systems known up to now.

Figure 2:
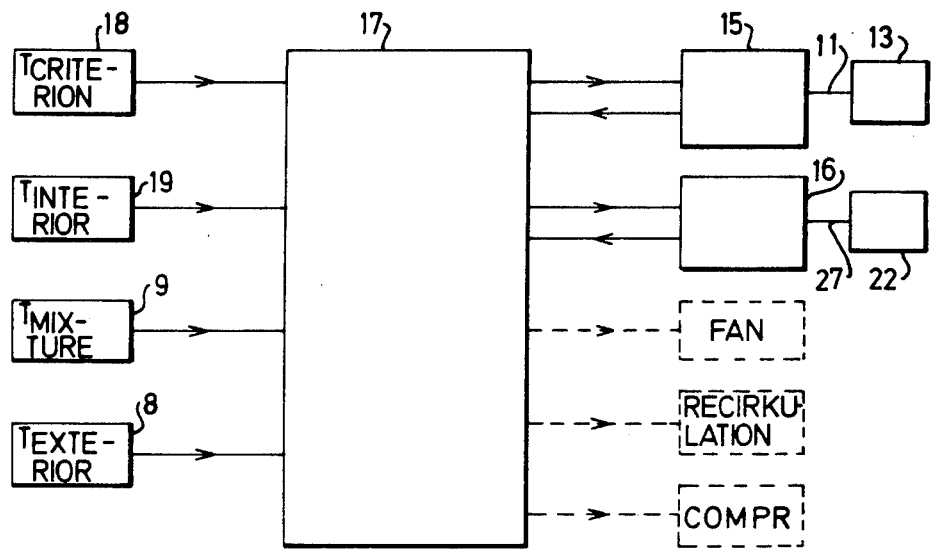
Figure 3:
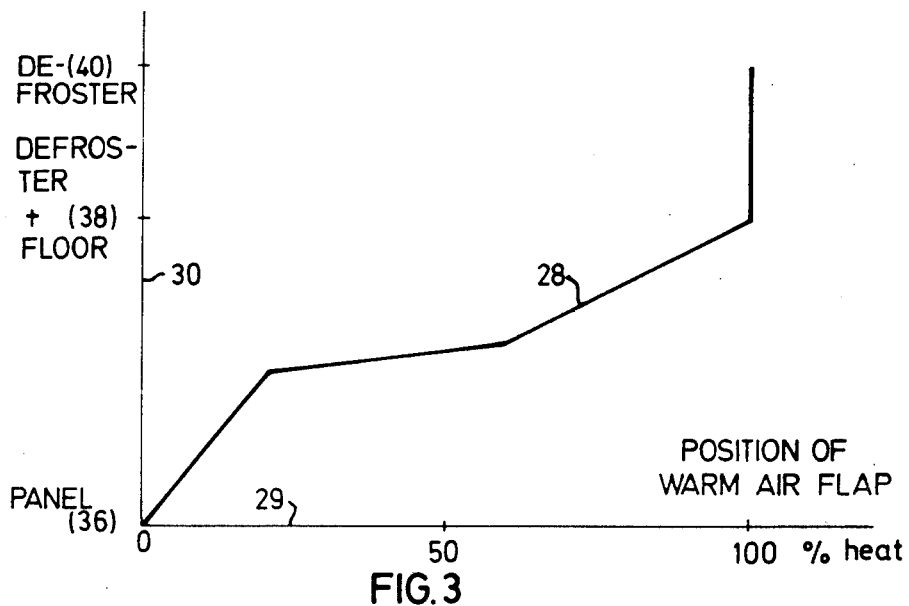

Other distinguishing features of the invention will be seen from the following example of an inventively formed vehicle ventilation and temperature adjustment system. The description is carried out while referring to the appended drawings, on which FIG. 1 is a section of a ventilation unit included in the system with means arranged therein for adjusting the temperature of and distributing ventilation air, FIG. 2 schematically illustrates the regulating principle of the ventilation system, and FIG. 3 is a diagram of the relationship between the settings for a warm air flap and a distributor flap included in the ventilation system.

A ventilation unit 1 illustrated in FIG. 1 is arranged for temperature adjustment and distribution of ventilation air to a plurality of nozzles in the interior of a vehicle. The construction of the unit 1 substantially conforms to that of the ventilation unit described in the Swedish patent application No. 8001515-9 previously filed by the applicant. The ventilation unit 1 is thus similarly formed with a transverse space 3 intended for accommodating an electric centrifugal fan (not shown). The fan is conventionally provided with a mounting flange, intended for screwed attachment to the ventilation unit 1. The fan is disposed for sucking in air via an air intake and an axial inlet, and for subsequently blowing the air to an inlet chamber 6 in the unit 1.

A heat exchanger 7 is mounted in the unit 1, and is adapted for the continuous passage of heated coolant from the vehicle engine, for which purpose the heat exchanger 7 is provided with inlet and outlet pipes (not shown).

The inlet chamber 6 of the unit 1 is in communication with a cold air duct 10 and a hot air duct 12, the latter accommodating the heat exchanger 7, and can thus be regarded as constituting a parallel branch duct to the first-mentioned duct 10. Air which is solely taken through the cold air duct 10 is not heated but air taken into the duct 12 is caused to pass the heat exchanger 7, thus being heated conventionally.

A pivotably mounted warm air flap 13 is disposed at the inlet 14 of the hot air duct 12 for regulating the amount of air which is to be supplied to said duct 12. The flap 13 is pivotably mounted by means of a flap shaft 11 which is pivotably mounted in the ventilation unit 1 and having a position projecting outside it. Said projecting portion is, via a spur gear (not shown), connected with the output shaft of an electric motor 15. Said motor is mounted on the unit 1 by means of a bracket (not shown) and enables infinitely variable setting of the warm air flap in different attitudes.

Air passing through the cold air duct 10 and hot air duct 12 in the ventilation unit 1 are subsequently mixed in a mixing chamber 20, the proportions of hot air and cold air determining the temperature for air departing from the mixing chamber 20. This air is taken to a distribution chamber 21, from which the ventilation air is distributed to different nozzles in the interior of the vehicle.

The distribution chamber 21 comprises a cylindrical chamber formed in the ventilation unit 1, an air intake 23 and three air outlets 24,25,26 being made in the mantle surface of the chamber. A distributor flap 22 is pivotably mounted in the distribution chamber 21, for guiding and distributing inflowing air to the different outlets, comprising a fascia board outlet 24, a floor outlet and/or a defroster outlet 26. The three outlets 24,25,26 are placed within a sector of 180° or less, while the inlet 23 is placed outside said sector.

The distributor flap 22 arranged in the distribution chamber 21 preferably comprises a substantially flat rectangular plate attached to a flap shaft 27, in turn rotatably mounted in the ventilation unit 1 in line with the center line (not shown) of the distribution chamber 21. Also the flap shaft 27 has a portion projecting outside the ventilation unit. Via a spur gear (not shown), the projecting portion of said flap shaft 27 is connected with the output shaft of an electric motor 16. This motor 16 is also mounted on the ventilation unit 1 by means of a bracket (not shown) and enables infinitely variable setting of the distributor flap 22 in different attitudes.

Regulating and setting the warm air flap 13 and the distributor flap 22 in different positions is accomplished by means of an electronic unit 17, controlled by a plurality of temperature transducers 8,9,18,19 which are connected thereto.

A temperature transducer 18 is disposed for transmitting a signal representing desired interior temperature ($T_{criterion}$). This transducer 18 comprises in practice a variable resistor which may be set manually or digitally via a clock unit. The resistor (not shown) is connected to a voltage source, and the signal applied to the electronic unit 17 is given a voltage level proportional to a manually set temperature ($T_{crit}$).

A second temperature transducer 19 is arranged in the vehicle interior to sense the actual interior temperature ($T_{interior}$). This transducer 19 is in practice a so-called thermistor, which may be regarded as a resistor responding to temperature. This transducer is also connected to an unillustrated voltage source and the signal sent from it to the electronic unit 17 is given a voltage level proportional to the sensed temperature in the interior.

There is further connected to the electronic unit 17 a temperature transducer 9, sensing the temperature ($T_{mixture}$) of the mixed ventilation air supplied to the interior, as well as a temperature transducer 8 sensing the temperature ($T_{exterior}$) surrounding the interior. Both latter transducers 8,9 are thermistors and function analogically with what has been stated for the interior temperature transducer 19.

Incoming signals are processed in the electronic unit 17 and signals are fed out to actuating means for regulating the ventilation system. With said object, the unit 17 is connected to the electric motor 15 regulating the attitude of the warm air flap 13. Said electric motor 15 is a type of servo motor conventional in control technology and is in the form of a step motor with feedback, and by means of the motor the air flap can be caused to assume different angular attitudes.

The motor 15 is preferably provided with two output shafts (not shown), of which one is connected to the shaft 11 of the warm air flap 13 via a spur gear, the other shaft being connected to a variable resistor (not shown). This resistor is connected to the electronic unit 17 and is an indicator for the position assumed by the warm air flap 13. Analogically, the unit 17 is also connected to the electric motor 16, regulating the attitude of the distributor flap 22. The warm air flap 13 and the distributor flap 22 are pivotable within differently large sectors. The spur gears coacting with respective shaft 11,27 are formed with different gear ratios so that the electronic unit 17 can control the settings of both the hot air flap 13 and distributor flap 22 in response to the signals representing temperature which are applied to the electronic unit 17.

The electronic unit 17 may be constructed by applying conventional semiconductor techniques, but it can also include a so-called microprocessor. With this in mind the electronic unit comprises a comparator (not shown) for comparing the signals transmitted by the temperature transducers 18,19 and representing desired interior temperature and actual interior temperature. In response to a possible difference between said signal values, the comparator transmits a signal for steering the warm air flap 13 via the electric motor 15 to an attitude evening out temperature.

The output signal from the comparator in the electronic unit 17 is also supplied to a converter (not shown), in which the signal is converted and transmitted to the electric motor 16 of the distributor flap 22. A signal converted in such a mode is linearly proportional, within at least given input signal limits. As will be seen from FIG. 2, the electric motor 16 for the distributor flap is also formed with a loop to the electronic unit 17, whereby the motor voltage can be regarded as an indicator of the relative setting of the distributor flap.

A graph 28 is shown in FIG. 3, showing the relationship between the positions of the distributor flap 22 and the different positions of the hot air flap 13. The warm air flap 13 position in percent of heat is given on the horizontal axis 29, zero percent (0%) heat corresponding to a completely closed-off hot air duct 12 and a completely open cold air duct 10, while one hundred percent (100%) heat corresponds to a completely open hot air duct 12 and a completely closed cold air duct 10. Different angular attitudes of the distributor flap 22 are given along the vertical axis 30 in FIG. 3. In the case where the warm air flap 13 assumes a position where ventilation air is not heated, i.e. 0% heat, the distributor flap 22 assumes a position where all ventilation air is supplied to the fascia board outlets 24, i.e. the distributor flap 22 assumes a fascia board position 36 in accordance with the situation shown in FIG. 1.

If the warm air flap 13 assumes a position corresponding to maximum heating, i.e. 100% heat, all the ventilation air is taken through the hot air duct 12. The distributor flap 22 then assumes a defroster position 40. With the warm air flap 13 between 0 and 100% heat, the distributor flap 22 assumes intermediate positions in response thereto, inter alia a defroster-floor position 38 in which all the ventilation air is supplied to the floor nozzles 25 and defroster nozzles 26. In principle the relationship between the different positions of the flaps 13,22 could be made linear, which would correspond in FIG. 3 to a straight line between the end positions of the flaps 13,22. In the practical distribution of the air, however, a more favourable and smoother transfer between the different ventilation outlets 24,25,26 will be obtained if the relationship between the flap positions is formed with different proportionality relationships for the different warm air flap settings. This results in that the graph 28 in FIG. 3 has so-called knees. Within the different part sectors in which the warm air flap 13 is movable there is, as will be seen from FIG. 3, a linear relationship between the respective settings of the flaps 13,22. The conversion to the actual proportionality relationships for different warm air flap settings is performed in the converter incorporated in the electronic unit 17.

As previously mentioned, a temperature transducer 9 is connected to the electronic unit 17 for sensing the mixed air temperature, i.e. the temperature the ventilation air has in the mixing chamber 20. This temperature transducer 9 is of particularly great importance when the hot air duct 12 is completely open, i.e. in the 100% heat setting. If the air mixture temperature is less than a predetermined temperature, e.g. 30° C., the electronic unit 17 will steer the distributor flap 22 to assume a setting 40 where all ventilation air is supplied to the defroster outlet 26. When the air mixture temperature reaches this predetermined temperature, the electronic unit will steer the distributor flap 22 to a setting 38 where both defroster and floor outlets are supplied with ventilation air. Said function is illustrated in FIG. 3 by a vertical line on the graph in the 100% heat setting.

The invention is not tied to the exemplified embodiment, but can be modified and developed in a plurality of other embodiments within the scope of the following claims. In the described system, the distribution chamber 21 is cylindrically shaped and solely includes one distributor flap 22, but in practice the chamber 21 can be formed differently and include several flaps. Similarly, the hot air duct 12 can be formed with several flap functions than are shown in FIG. 1.

As far as the electronic unit 17 is concerned, this can be limited to include only simple components for carrying out inventive flap functions, but the electronic unit can also be adapted and formed for regulating other functions as well within the ventilating and temperature-setting system. In FIG. 2 the electronic unit 17 is illustrated as being adapted for steering the fan included in the ventilation system, a recirculation flap (not shown) to a so-called recirculation entry and also coupling in a compressor (not shown) in the cases where the system includes a cooling unit equipped with a compressor.

Further to temperature transducers 18,19, sensing actual interior temperature ($T_{int}$) and transducers indicating desired interior temperature ($T_{crit}$), the temperature transducer 9 sensing the air mixture is also connected to the electronic unit, as well as a temperature transducer 8 sensing the temperature outside the interior. In response thereto, the warm air flap 13 can be caused to assume a position deviating from its normal setting for the purpose of accelerating temperature increase in the interior.

What we claim is:

1. An arrangement in a vehicle ventilating and temperature-adjusting system, the arrangement comprising:
    a ventilation unit having at least one inlet for entering air and having a plurality of ventilation outlets for the exit of air into the interior of a vehicle, the ventilation unit further having a cold air duct and a hot air duct, each connected for receiving air from the inlet and each having a respective duct outlet for the exit of air from the air duct to the ventilation outlets;
    a heat exchanger mounted in the hot air duct;
    at least one movable warm air flap mounted in the ventilation unit after the inlet, the warm air flap being movable into any of a respective plurality of angular attitudes for regulating the proportion of the air that enters through the inlet which flows through the heat exchanger;
    at least one movable air distributor flap mounted in the ventilation unit between the duct outlets and the ventilation outlets, the air distributor flap being movable into any of a respective plurality of angular attitudes for distributing the air that exits from the duct outlets among the ventilation outlets;
    first and second electric servo means connected to the warm air flap and the air distributor flap, respectively, each of the servo means being selectively activable for moving the respective flap to any of its respective plurality of angular attitudes;
    a first transducer for providing a first temperature signal representing an actual interior temperature;
    a second transducer for providing a second temperature signal representing a desired interior temperature; and
    an electronic unit connected for receiving the first and second temperature signals and operable for comparing the first and second temperature signals and for transmitting output signals to the first and second servo means for synchronizing and controlling the angular attitudes of the respective flaps.

2. The arrangement of claim 1, wherein the first and second servo means each comprise an electrical step motor for moving the respective flap to any of its respective plurality of angular attitudes in response to the output signals from the electronic unit.

3. The arrangement of claim 1, wherein the warm air flap is movable to any of its attitudes between a closed angular attitude in which a minimum proportion of the entering air flows through the heat exchanger and an open angular attitude in which a maximum proportion of the entering air flows therethrough, the ventilation outlets including a fascia board outlet, the electronic unit being further operable for synchronizing the angular attitude of the warm air flap between the closed angular attitude and the open angular attitude with the angular attitude of the air distributor outlet between a first angular attitude in which a maximum amount of the exiting air flows to the fascia board outlet and a second angular attitude in which a minimum amount of the exiting air flows thereto.

4. The arrangement of claim 3, wherein the electronic unit is further operable for causing the synchronized movement of the warm air flap and the air distributor flap across their respective pluralities of angular attitudes at first and second rates, respectively, the ratio between the first and second rates having a plurality of different values, each of the different values occurring within a respective range of the synchronized angular attitudes of the flaps.

5. The arrangement of claim 4, wherein the duct outlets are arranged for mixing the air that exits from the air ducts, the arrangement further comprising a third transducer in the ventilation unit after the air ducts for providing a third temperature signal representing the temperature of the mixed air, the ventilation outlets including a defroster outlet, the electronic unit being further operable in response to the third temperature signal for controlling the angular attitude of the air distributor flap for distributing all of the exiting air to the defroster outlet when the warm air flap is in the open angular attitude and the temperature of the mixed air is lower than a predetermined temperature.

6. The arrangement of claim 5, further comprising a fourth transducer for providing a selection signal representing a manual selection, the electronic unit being further operable in response to the selection signal for controlling the angular attitude of the air distributor flap for distributing exiting air to the defroster outlet according to the manual selection when the warm air flap is in the open attitude.

7. The arrangement of claim 5, wherein all of the exiting air flows to the fascia board outlet when the air distributor flap is in the first angular attitude and the warm air duct is in the closed angular attitude.

8. An arrangement in a vehicle ventilating and temperature-adjusting system, the arrangement comprising:
a ventilation unit having at least one inlet for entering air and having a plurality of ventilation outlets for the exit of air into the interior of a vehicle, the ventilation unit further having first and second air ducts, each connected for receiving air from the inlet and each having a respective duct outlet for exit of air from the ducts to the outlets;
temperature changing means mounted in the first air duct for changing the temperature of air flowing through the first air duct;
regulating means mounted in the ventilation unit after the inlet and selectively adjustable over a respective range of positions for regulating the proportion of the air that enters through the inlet that flows through the first air duct;
distributing means mounted in the ventilation unit between the duct outlets and the ventilation outlets and selectively adjustable over a respective range of positions for distributing the air that exits from the duct outlets among the plurality of ventilation outlets;
control circuitry connected for sensing at least one temperature and for selectively adjusting the regulating and distributing means over their respective ranges of positions in a synchronized manner in response to the sensed temperature for controlling the temperature of the air and the distribution of the air among the outlets.

9. The arrangement of claim 8, wherein the control circuitry comprises:
a first transducer for providing a first signal representing an actual interior temperature;
a second transducer for providing a second signal representing a desired interior temperature; and
a processing circuit for comparing the first and second signals and for generating control signals for controlling the selective adjustment of the regulating means and distributing means.

10. The arrangement of claim 9, wherein the control signals generated by the processing circuit include first and second control signals for selectively adjusting the regulating means and distributing means, respectively, the regulating means and distributing means each further comprising a respective one of first and second servo means for adjusting the respective one of the regulating means and distributing means in response to the respective one of the first and second control signals.

11. The arrangement of claim 8, wherein the regulating means and distributing means each further comprise a respective one of first and second shafts pivotably mounted in the ventilation unit and a respective one of first and second flaps, each of the first and second flaps being mounted to the respective one of the first and second shafts for pivoting therewith, each of the regulating and distributing means further comprising a step motor connected for turning the respective one of the first and second shafts to an angular attitude in response to the control circuitry.

12. The arrangement of claim 8, wherein the respective ranges of positions of the regulating means and distributing means are continuous.

13. The arrangement of claim 8, wherein the range of positions of the regulating means ranges between an open position in which a maximum proportion of air flows through the first air duct and a closed position in which a minimum proportion of air flows therethrough, the control circuitry being operable for adjusting the distributing means in synchronization with the regulating means over a sector of its range of positions between a first position for distributing a maximum amount of the exiting air to a first one of the outlets when the regulating means is in the closed position and a second position for distributing a minimum amount of the exiting air to the first outlet when the regulating means is in the open position.

14. The arrangement of claim 13, wherein the first outlet is provided in a fascia board of the interior of the vehicle, the control circuitry being further operable for adjusting the distributing means to distribute all of the exiting air to the first outlet when the regulating means is in the closed position for providing all of the exiting air to the fascia board.

15. The arrangement of claim 13, wherein the regulating means and distributing means each further comprise a respective one of first and second flaps, the control circuitry being further operable for adjusting each of the flaps over a respective range of angular attitudes at a respective one of first and second rates, the first flap being adjustable over a first range of angular attitudes as the regulating means is adjusted between the open and closed positions, the second flap being adjustable over a second range of angular attitudes synchronized therewith, the first and second ranges each comprising a plurality of subranges, each subrange of the first range corresponding to a subrange of the second range, the ratio between the first and second rates being constant within each pair of corresponding subranges.

16. The arrangement of claim 13, wherein the duct outlets are arranged for mixing the air that exits from the air ducts, the control circuitry comprising a third transducer for providing a third temperature signal for representing the temperature of the mixed air, the control means being further operable for adjusting the distributing means in synchronization with the regulating means for providing all of the mixed air to a second one of the outlets when the regulating means is in the open position and the mixed air temperature is lower than a predetermined temperature.

17. The system of claim 16 in which the second outlet is connected for providing air to at least one defroster outlet in the interior of the vehicle.

18. The system of claim 16 in which the control circuitry further comprises a fourth transducer for providing a selection signal representing a manual selection, the control circuitry being further operable for adjusting the distributing means in synchronization with the regulating means for regulating the amount of the mixed air flowing to the second outlet in response to the selection signal when the regulating means is in the open position.

* * * * *